United States Patent

Barske

Patent Number: 5,362,097
Date of Patent: Nov. 8, 1994

[54] AIRBAG DEVICE MOUNTED IN A ROOF FRAME REGION OF A VEHICLE

[75] Inventor: Heiko Barske, Wolfsburg, Germany

[73] Assignee: Volkswagen AG, Wolfsburg, Germany

[21] Appl. No.: 21,486

[22] Filed: Feb. 23, 1993

[30] Foreign Application Priority Data

Mar. 2, 1992 [DE] Germany .............. 4206474

[51] Int. Cl.⁵ ............................... B60R 21/22
[52] U.S. Cl. ......................... 280/730 R; 280/730 A
[58] Field of Search ............ 280/730 R, 730 A, 728 R

[56] References Cited

U.S. PATENT DOCUMENTS

| | | | |
|---|---|---|---|
| 2,806,737 | 9/1957 | Maxwell | 280/730 R |
| 2,834,606 | 5/1958 | Bertrand | 280/730 R |
| 3,733,088 | 5/1973 | Stephenson | 280/730 R |
| 3,774,936 | 11/1973 | Barnett et al. | 280/730 R |
| 4,966,388 | 10/1990 | Warner et al. | 280/730 A |

FOREIGN PATENT DOCUMENTS

| | | | |
|---|---|---|---|
| 2249988 | 4/1974 | Germany . | |
| 2628815 | 5/1978 | Germany | 280/730 R |
| 2255535 | 11/1992 | United Kingdom | 280/730 A |

Primary Examiner—Brian L. Johnson
Assistant Examiner—Christopher P. Ellis
Attorney, Agent, or Firm—Brumbaugh, Graves, Donohue & Raymond

[57] ABSTRACT

An airbag device in a roof frame region of a vehicle includes an airbag and a casing provided with orifices to supply gas to the airbag, the casing being formed by the roof frame region itself, and the airbag forming a constituent part of a roof frame lining in the collapsed condition.

1 Claim, 1 Drawing Sheet

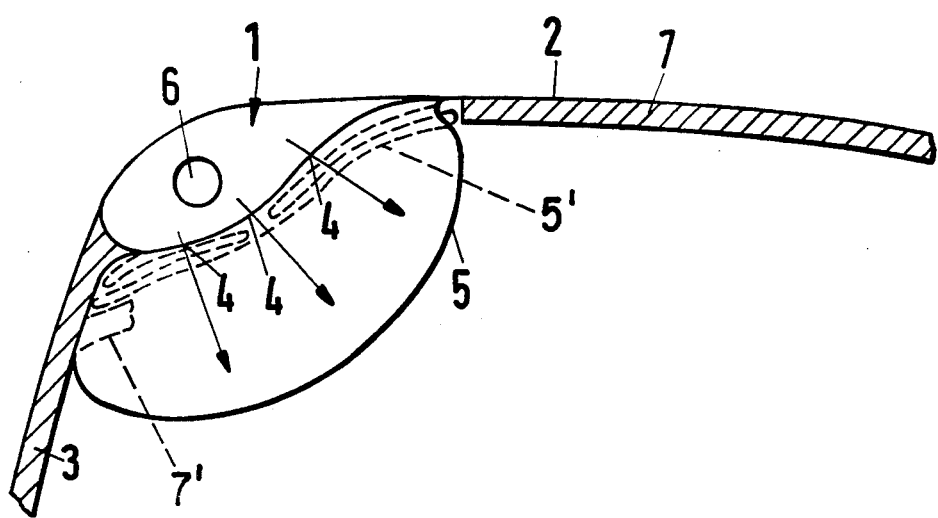

AIRBAG DEVICE MOUNTED IN A ROOF FRAME REGION OF A VEHICLE

BACKGROUND OF THE INVENTION

This invention relates to airbag devices mounted in a region of the roof frame of a vehicle.

German Offenlegungsschrift No. 22 49 988 discloses an airbag mounted in the roof frame region of a vehicle in which a casing equipped with valves activable by way of an impact sensor to supply gas into the airbag, is interposed between the roof frame of the vehicle and the airbag to be inflated. The casing may be the casing of a gas generator or a gas reservoir. In this arrangement, the airbag and the casing constitute parts of the inner lining of the roof frame which is often in the form of a canopy covering the entire roof in the interior of the vehicle. Activation of the airbag by generation of gas can be effected by way of an impact sensor in the usual manner, for example, pyrotechnically.

This conventional airbag device takes account of the fact that, in an accident, vehicle occupants should be protected from striking the head against the hard roof frame. This is especially applicable to the side regions of the roof frame since conventional restraint systems such as safety belts are largely ineffectual in a side collision. In the above-mentioned prior art, integration of the airbag and the casing with the roof frame lining advantageously ensures that the airbag device will not protrude into the interior of the vehicle in the unactivated condition. A disadvantage, however, is that, in order to achieve a flush surface of the roof frame lining in the region of the airbag device, the hard casing can be covered by only a very flatly collapsed airbag. As a result, in the first place the airbag must be comparatively small, and in the second place this region of the roof frame forms a hard impact surface for the head of the occupant, for example, when getting in or out of the vehicle, in the deactivated condition of the airbag.

SUMMARY OF THE INVENTION

Accordingly, it is an object of the present invention to provide an airbag device mounted in the roof frame region of a vehicle which overcomes the disadvantages of the prior art.

Another object of the invention is to provide an airbag device of this kind which is arranged so that the space conditions in the vehicle roof frame region are optimally utilized to accommodate the airbag device.

These and other objects of the invention are attained by providing an airbag device in which the casing comprises a part of the roof frame and the airbag is mounted adjacent to the frame.

Thus, in order to provide a casing for furnishing an airbag device with gas, the invention advantageously utilizes a vehicle component that is present in any event, i.e., the roof frame, which is conventionally in the form of a closed hollow section. If desired, this hollow section of the roof frame may be enlarged and/or reshaped in cross-section in order to provide optimal conditions for the configuration of the airbag device. No additional casing or container for the gas supply to the airbag is required. Consequently, a larger airbag or, alternatively, a plurality of small airbags may readily be so folded together that, in deactivated condition, their inner surfaces are steplessly integrated with the inner surface of the main part of the roof frame lining as, for example, a molded canopy.

BRIEF DESCRIPTION OF THE DRAWING

Further objects and advantages of the invention will be apparent from a reading of the following description in conjunction with the accompanying drawing, which is a schematic fragmentary vertical sectional view showing the roof frame region of a vehicle equipped with a representative embodiment of an airbag device arranged in accordance with the invention.

DESCRIPTION OF PREFERRED EMBODIMENT

In the typical embodiment of the invention shown in the drawing, a roof frame 1 is disposed between a roof 2 and a vertical column 3, for example a door post, of the vehicle. The specific details of the construction are not of interest, since the invention may be employed independently of any particular construction.

The inward-facing wall of the section forming the roof frame 1 is provided with a plurality of passage orifices 4 to supply a gas which, in the event of a collision, inflates an airbag 5, which is illustrated in solid line in its inflated condition. In the event of a collision, the gas supply is generated in the conventional manner, for example, pyrotechnically, by a gas generator 6.

In the deactivated condition, the airbag 5 is stored in the collapsed condition and is maintained flush with a roof lining 7 so as to form part of the lining in the collapsed condition as illustrated by the dotted lines 5' but readily releasable by hook-and-loop or similar fastening means, 7' for example.

The invention thus provides an airbag device which requires no additional space in the vehicle in the deactivated condition and is composed, at least in large part, of components which are present in the vehicle in any event, i.e., the roof frame and its lining.

Although the invention has been described herein with reference to a specific embodiment, many modifications and variations therein will readily occur to those skilled in the art. Accordingly, all such variations and modifications are included within the intended scope of the invention.

I claim:

1. An airbag device for a vehicle comprising a roof frame including a roof frame member providing support for a roof of a vehicle, an interior roof lining adjacent to the roof of the vehicle, at least one airbag mounted adjacent to a portion of the roof frame member and, while in its deflated state, forming an extension of the roof lining adjacent to the roof frame member, the portion of the roof frame member adjacent to the airbag being hollow and having at least one orifice to permit transfer of gas from the hollow space within the roof frame member to the airbag, and a gas generator disposed within the roof frame member to supply gas to the hollow space therein and through the orifice to the airbag.

* * * * *